United States Patent
Zhang et al.

(10) Patent No.: US 8,488,453 B2
(45) Date of Patent: Jul. 16, 2013

(54) METHOD AND APPARATUS FOR ENHANCED UPLINK DATA TRANSMISSION

(75) Inventors: Xiaobo Zhang, Shanghai (CN); Ni Ma, Shanghai (CN); Yueheng Li, Shanghai (CN)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 952 days.

(21) Appl. No.: 11/914,761

(22) PCT Filed: May 10, 2006

(86) PCT No.: PCT/IB2006/051466
§ 371 (c)(1), (2), (4) Date: Nov. 19, 2007

(87) PCT Pub. No.: WO2006/123275
PCT Pub. Date: Nov. 23, 2006

(65) Prior Publication Data
US 2008/0198800 A1    Aug. 21, 2008

(30) Foreign Application Priority Data
May 18, 2005    (CN) .......................... 2005 1 0071334

(51) Int. Cl.
*H04J 1/16* (2006.01)
*H04J 3/14* (2006.01)
*H04L 1/00* (2006.01)
*H04L 12/26* (2006.01)

(52) U.S. Cl.
USPC ........ 370/230; 370/230.1; 370/231; 370/232; 370/233; 370/234

(58) Field of Classification Search
USPC ................. 370/230, 329, 468, 335, 412, 338, 370/328, 395.21; 455/452.2
See application file for complete search history.

(56) References Cited

U.S. PATENT DOCUMENTS

| | | |
|---|---|---|
| 6,826,160 B1 | 11/2004 | Wang et al. |
| 2005/0047366 A1 | 3/2005 | Ghosh et al. |
| 2005/0053035 A1 | 3/2005 | Kwat et al. |
| 2005/0250511 A1 * | 11/2005 | Xiao et al. .................... 455/453 |

FOREIGN PATENT DOCUMENTS

| | | |
|---|---|---|
| WO | 2004034656 A2 | 4/2004 |
| WO | WO 2004/034656 * | 4/2004 |

OTHER PUBLICATIONS

Hak-Seong Kim et al: "Enhanced Uplink Scheduler Designs in UMTS".
Dr. Ariela Zeira: "Evolution of 3G Wireless Systems", 2003, http://www.ieee.li/pdf/viewgraphs_evolution_3g.pdfDr.
"Uplink Physical Channel Structure", 2003, ftp://ftp.3gpp.org/tsg_ran/WG1_RL1/TSGR1_32/Docs/Zips/R1-030399.zip.
Stefan Parkvall: Uplink Enhancements for Dedicated Transport Channels, www.control.isy.liu.se/wireless systems2002/pres/parkvall.pdf.

* cited by examiner

*Primary Examiner* — Kwang B Yao
*Assistant Examiner* — Adam Duda

(57) ABSTRACT

A method and apparatus used for enhanced uplink data transmission include monitoring the communication status of a plurality of UEs (user equipment) which conduct uplink data transmission in the RAN; receiving the data transmitted on at least one dedicated uplink channel from at least one of the plurality of UEs; and according to the communication status of the plurality of UEs, dynamically allocating the number of dedicated uplink channels for at least one UE of the plurality of UEs.

20 Claims, 7 Drawing Sheets

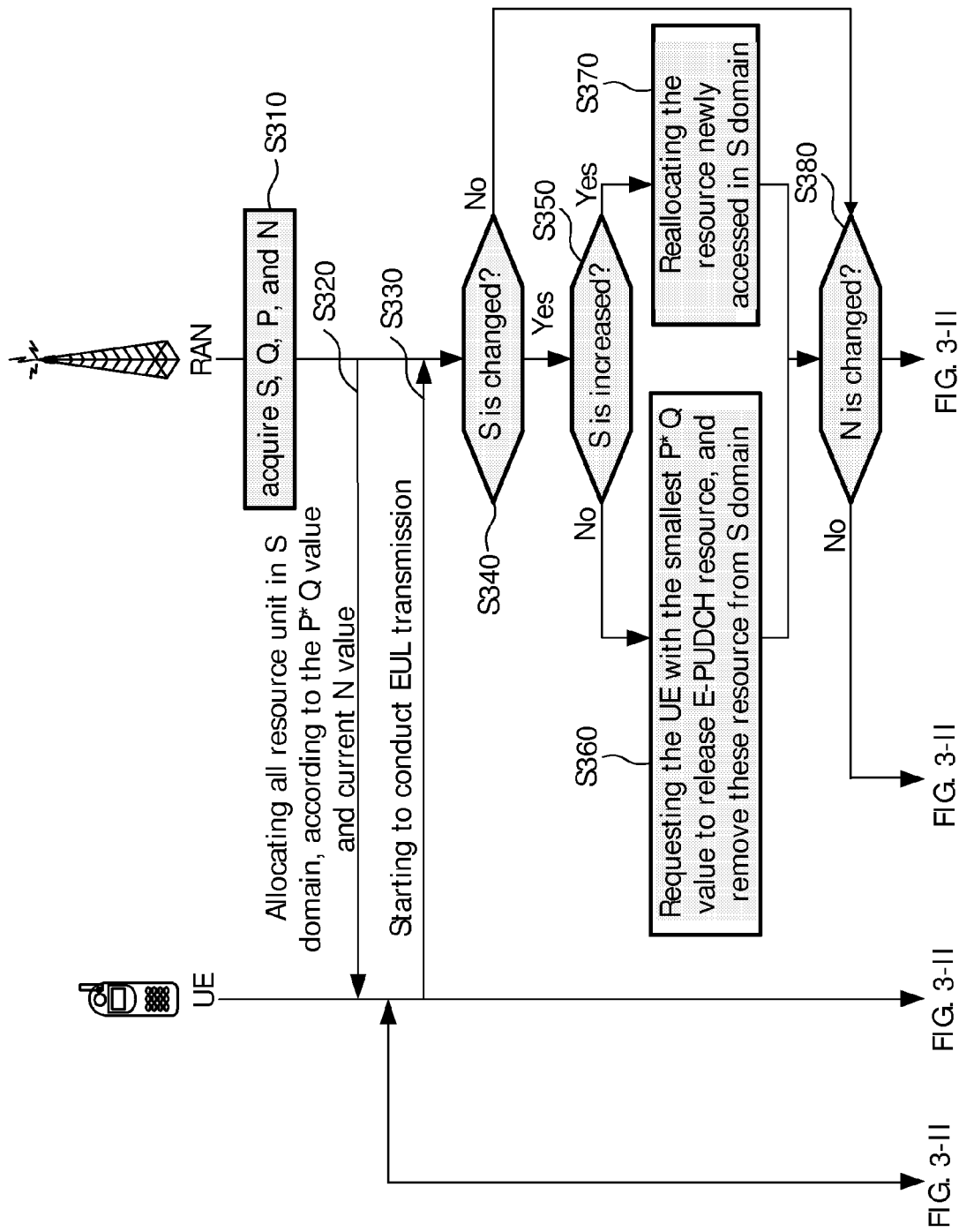
FIG. 3-I

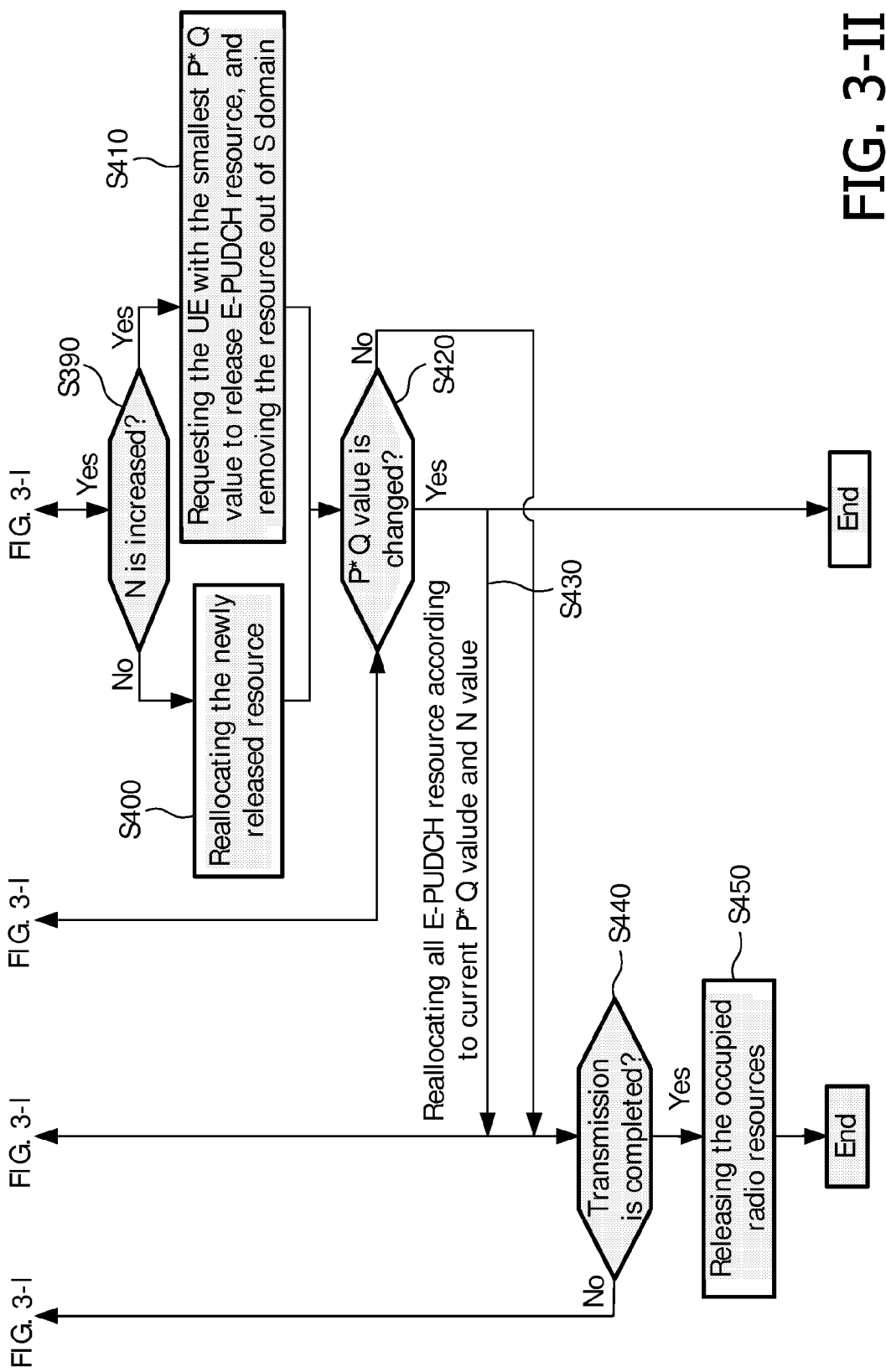
FIG. 3-II

… (US 8,488,453 B2)

METHOD AND APPARATUS FOR ENHANCED UPLINK DATA TRANSMISSION

FIELD OF THE INVENTION

The present invention relates generally to TDD CDMA communication system, and more particularly, to a method and apparatus for enhanced uplink data transmission in TDD CDMA communication system.

BACKGROUND OF THE INVENTION

In recent years, in order to satisfy the diverse demands of mobile subscribers, not only higher downlink transmission data rate, but also higher uplink transmission data rate is required in 3G communication system. HSDPA (High Speed Downlink Packet Access) is packet-based data service, which enhances downlink transmission of mobile data. For the downlink channel (5 MHz bandwidth) in WCDMA system, the maximum transmission data rate supported by HSDPA can be up to 10 Mbps. The key technologies which HSDPA adopts are Adaptive Modulation and Coding (AMC) and Hybrid Automatic Repeat Request (HARQ). EUL (Enhanced Uplink) technology is proposed to improve uplink transmission data rate under the support of E-DCH (Enhanced-Dedicated Channel) technology. Nevertheless, in existing TDD specifications, there is no detailed definition for the physical layer architecture of E-DCH.

In addition, during traditional uplink data transmission, one issue is that the uplink channel is not allowed to be dynamically changed any more, once allocated. However, there would be considerable imbalance for traffic rate of uplink data, for instance, during communication process, when huge volume of data is needed to be transmitted, the capacity of the allocated channel can not satisfy the demands for transmitting such large amount of data, and when small volume of data transmission is needed, the spare channel resource will be wasted.

Therefore, a complete solution of method and apparatus for enhanced uplink data transmission is needed, which enables mobile terminal to conduct efficient uplink transmission.

SUMMARY OF THE INVENTION

The object of the present invention is to provide a method and apparatus for enhanced uplink data transmission, which can dynamically allocate uplink channel, so as to enable mobile terminal to conduct more efficient uplink data transmission.

According to the present invention, a method used for enhanced uplink data transmission in radio access networks (RAN) is provided, wherein the method comprises the steps of: monitoring the communication status of a plurality of user equipments (UEs) which are conducting uplink data transmission in the RAN; receiving the data transmitted on at least one dedicated uplink channel from at least one of the plurality of UEs; allocating dynamically the number of dedicated uplink channels for at least one UE of the plurality of UEs, according to communication status of the plurality of UEs.

According to the present invention, it is provided a method used for enhanced uplink data transmission in user equipment (UE), comprising the steps of: acquiring at least one dedicated uplink channel, which is allocated by the radio access network (RAN) according to communication status of the UE; performing uplink data transmission on the dedicated uplink channel; according to allocation information of the RAN and communication status of the UE, dynamically adjusting the number of the dedicated uplink channels to enable the UE to conduct uplink data transmission on the adjusted dedicated uplink channels.

According to the present invention, it is provided a UE comprising: a data transmission apparatus, for conducting uplink data transmission to a RAN on at least one dedicated uplink channel; an adjusting apparatus, for adjusting the number of dedicated uplink channels according to allocation information relating to the UE sent from the RAN, so as to enable the transmission apparatus to conduct uplink data transmission on adjusted dedicated uplink channels.

According to the present invention, it is provided a RAN used to enable a plurality of UEs to conduct uplink data transmission on at least one dedicated uplink channel. The RAN comprises: a monitoring apparatus, for monitoring communication status of the plurality of UEs; a receiving apparatus, for receiving data by enhanced uplink transmission from the plurality of UEs; an allocation apparatus, for dynamically allocating the number of dedicated uplink channels for at least one UE according to the communication status of the plurality of UEs.

As described above, the method and apparatus for uplink data transmission according to the present invention, enables UE to conduct more efficient uplink data transmission, and also optimizes the corresponding E-DCH resource allocation and makes it more reasonable.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 is a flowchart illustrating dynamical E-PUDCH resource allocation according to an embodiment of the present invention;

Throughout all the above drawings, like reference numerals will be understood to refer to like, similar or corresponding features or functions.

DETAILED DESCRIPTION OF THE INVENTION

Detailed descriptions will be given below to the present invention in conjunction with specific embodiments and accompanying drawings.

Figure 1:
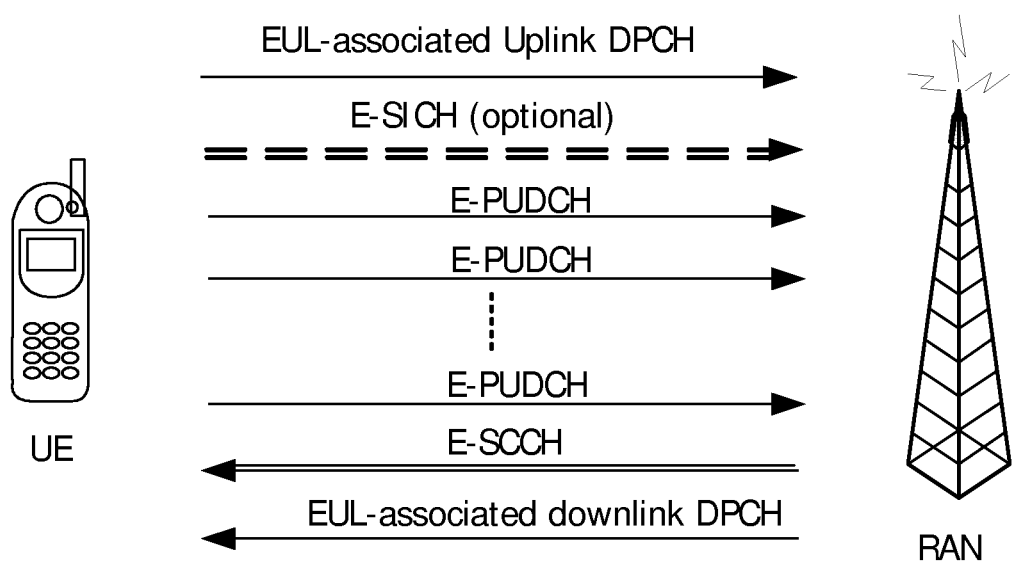
FIG. 1 is a schematic diagram illustrating physical channel configuration of enhanced uplink data transmission according to an embodiment of the present invention.

FIG. 1 shows a schematic diagram illustrating physical channel configuration of enhanced uplink data transmission according to an embodiment of the present invention. UE (User Equipment) transmits uplink data on at least one enhanced uplink dedicated physical channel, which is called E-PUDCH (Enhanced Physical Uplink Dedicated Channel) in the present invention and is used for transmitting uplink data to RAN (Radio Access Network), in the meanwhile, E-PUDCH can also be used for sending uplink feedback information to RAN, and the relevant feedback information includes transmission control signal. Alternatively, UE can also send uplink feedback information to RAN on enhanced share information channel, which is called E-SICH (Enhanced Shared Information Channel) in the present invention. E-SICH is an uplink channel, used for sending feedback information from UE to RAN, wherein the relevant feedback information includes: transmission type, the size of transmission block, HARQ related information including HARQ process identifier, new data indicator and incremental redundancy version number. Since E-PUDCH can not only transmit uplink data, but also send uplink feedback information, E-SICH is therefore an optional channel. RAN send control information to UE through enhanced share control channel, which is called E-SCCH (Enhanced Shared Control Channel) in the present invention. E-SCCH is a downlink channel, which is used for RAN (Radio Access Network) to send control information to UE. The relevant control information includes: UE identifier, ACK/NAK (Acknowledgement/Not-Acknowledgement) and TPC (Transmit Power Control). In addition, an EUL-associated uplink DPCH (Dedicated Physical Channel) is used for sending synchronization request and power control request from UE to RAN, and an EUL-associated downlink DPCH is used for sending SS (Synchronization Shift) TPC information from RAN to UE.

Through E-PUDCH provided according to an embodiment of the present invention, UE is enabled to perform enhanced uplink data transmission to RAN, and in the meanwhile, the number of E-PUDCHs could be dynamically allocated and adjusted according to UE's communication status after the number is allocated, which makes UE implement more efficient uplink data transmission. The detailed implementation is described with the conjunction of FIG. 2 and FIG. 3.

Figure 2:
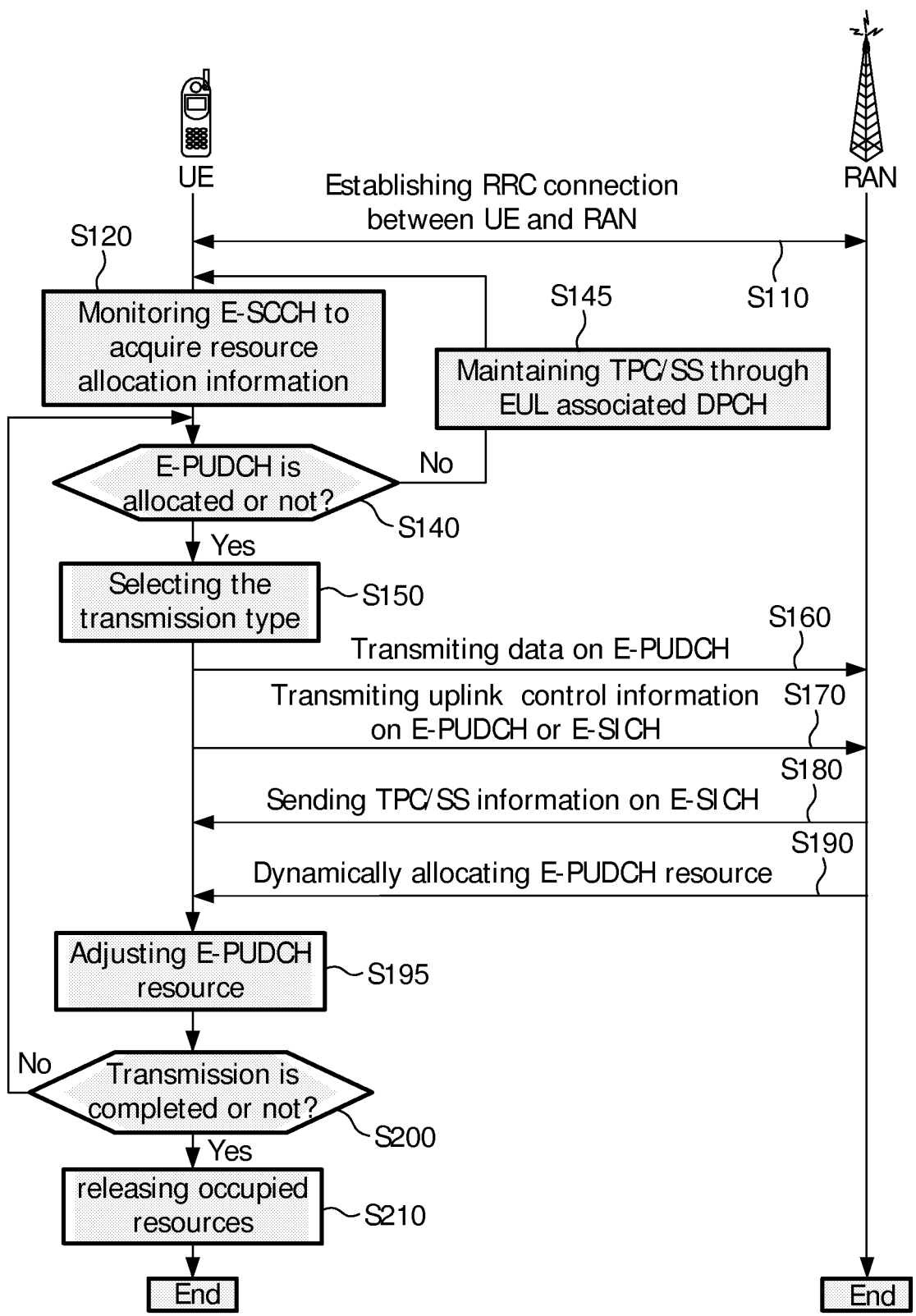
FIG. 2 is a flowchart illustrating enhanced uplink data transmission according to an embodiment of the present invention.

FIG. 2 shows a flowchart illustrating enhanced uplink data transmission according to an embodiment of the present invention. Firstly, UE establishes RRC (Radio Resource Control) connection with RAN (step S110), wherein RRC connection is a kind of bidirectional point-to-point connection between RRC protocol layer of UE and RAN. For a communicating UE, there is one RRC connection at most. RRC connection transmits the wireless network signaling between UE and RAN, e.g., allocation of wireless resource and the like. RRC connection is established when call is initially established and released after the communication is ended, between which the RRC connection needs to be maintained.

UE monitors E-SCCH to obtain E-PUDCH resource allocation information (step S120); then judges if E-PUDCH is allocated to UE (step S140); if not, UE maintains SS and TPC through EUL-associated DPCH (step S145).

If yes, UE executes EUL data transmission, which is described in detail as following: first, UE (or RAN) chooses AMC (Adaptive Modulation and Coding) transmission mode (step S150); then, UE transmits data on E-PUDCH (step S160) and transmits uplink control information on E-PUDCH or E-SICH (step S170); after receiving the data from UE, RAN sends TPC and SS (Synchronization Shift) through E-SCCH (step S180), then, according to the communication status of the UE performing uplink data transmission, RAN dynamically allocates E-PUDCH resources (step S190); According to RAN's E-PUDCH allocation information, UE dynamically adjusts the number of E-PUDCHs (step S195);

Eventually, UE judges if the data transmission is completed (step S200), if yes, relating wireless resources will be released (step S210), if no, UE returns to step S140, and judges if E-PUDCH has been allocated to itself.

FIG. 3 shows a flowchart illustrating dynamical E-PUDCH resource allocation according to an embodiment of the present invention. To be simplicity, firstly some relevant parameters are defined as following: Q denotes real-time communication quality of the channel occupied by the communicating UE; P denotes the UE's QoS (Quality of Service) level, that is different types of services are queued into different QoS queues, which makes transmission priority for some services (e.g. voice service) higher than other services (e.g. data service), so as to reduce transmission latency and guarantee the real time transmission quality; N denotes the number of all UEs conducting the enhanced uplink transmission in wireless network; S denotes the number of all E-PUDCHs which are allocated by RAN to the UE for conducting enhanced uplink transmission.

The assignment/re-assignment of the number of E-PUDCHs acquired by each UE will be based on the Q, P, N and S value. The approaches for RAN to acquire these parameters are as follows: RAN measures UEs' uplink channel quality to get P; Q is directly extracted from UE's QoS level or service type; S is extracted from RRC (Radio Resource Control) information of RAN; N is yielded according to the number of UEs conducting the EUL transmission currently.

For every UE conducting the enhanced uplink transmission, RAN will allocate/re-allocate the suitable number of E-PUDCHs according to following two basic principles:

1. If the UE has a higher P*Q value (P*Q is a synthetic parameter used to denote the quality of channel and QoS level), it will be allocated more E-PUDCHs, otherwise it will be allocated less E-PUDCHs.

2. If the N value is smaller in the cell, that means there are a few UEs conducting EUL transmission, the cell will be allocated more E-PUDCHs, otherwise it will be allocated less E-PUDCHs.

The following shows the proposed procedure for dynamical allocation of the E-PUDCH resource shown in FIG. 3:

RAN obtains parameter S, P, Q and N (step S310);

RAN allocates all the E-PUDECH resource units according to the P*Q value and current N value (step S320);

The UEs conduct the EUL transmission on E-PUDCH (step S330);

RAN judges if the value of S is changed (step S340);

If S is changed, the UE judges if S is increased (step S350), i.e. judges if RAN gets new E-PUDCH resources. If yes, the new available E-PUDCH resource in S domain (i.e. inside RAN coverage area) will be re-allocated (step S370); if no, S is decreased, RAN requests the UE with the smallest P*Q value to release E-PUDCH resources and remove these resources from S domain (step S360). If S value is unchanged, then UE judges if N value is changed (step S380), i.e. judges if the number of all UEs conducting EUL transmission in RAN is changed.

If N value is changed, UE judges if N is increased (step S390), that is judging if the number of UEs conducting EUL transmission is increased; if yes, RAN will request the UE with the smallest P*Q value to release E-PUDCH resources and allocate the released resources to the new accessed UEs (step S410); if not, RAN will reallocate the new released resources (step S400); if N value is unchanged, UE judges if P*Q value is changed. (step S420).

If P*Q value is changed, that is the synthetic parameter of the channel quality and QoS level parameter changes, RAN will reallocate all the resources in S domain according to currently P*Q value of each UE and the number of UEs conducting EUL transmission (step S430); if P*Q is unchanged, then UE judges if transmission has completed (step S440); if yes, the relevant occupied wireless resources will be released (step S450); if not, then go back to step S330 and continue EUL transmission on E-PUDCH.

Figure 4:
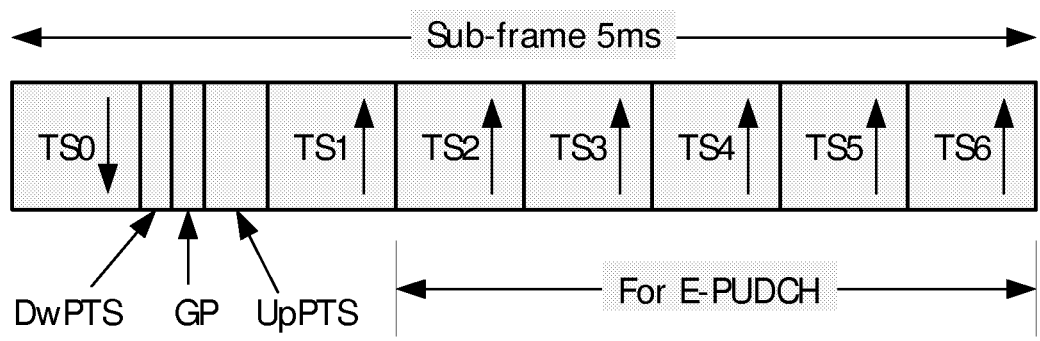
FIG. 4 is a schematic diagram illustrating the timeslot of enhanced uplink data transmission according to an embodiment of the present invention.

FIG. 4 shows schematic diagram illustrating the timeslot of enhanced uplink data transmission according to an embodiment of the present invention. In the embodiment, five timeslots (TS) (TS2~TS6) in one sub-frame are assigned for E-DCH transmission. At most five TSs per sub-frame can be allocated for E-DCH, because one TS must be served for the EUL-associated DPCHs.

Figure 5:
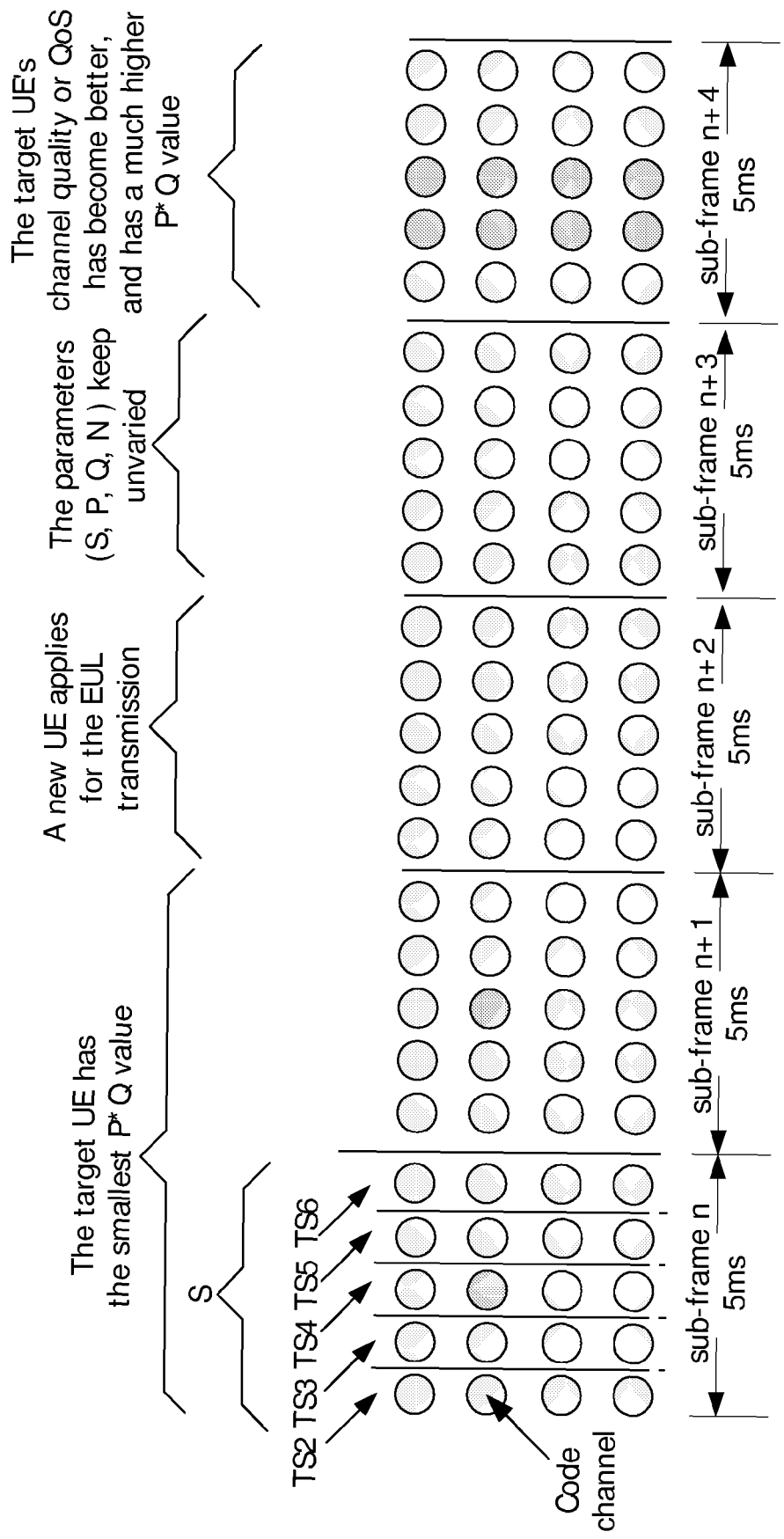
FIG. 5 is a schematic diagram illustrating dynamically allocating E-PUDCH resources according to an embodiment of the present invention.

FIG. 5 shows a schematic diagram illustrating dynamical allocation of E-PUDCH resources according to an embodiment of the present invention. As shown in FIG. 5, the allocation status of code channels in different sub-frame when E-PUDCH resources are dynamically allocated to one "target" UE is provided (the grey area represents the code channel has been occupied). During sub-frame n and n+1: the target UE has the supposed smallest P*Q value, so the UE is allocated only one code channel; In sub-frame n+2: a new UE requests to conduct enhanced uplink transmission, so the target UE is requested to release its code channel because it has the smallest P*Q value. As a result, the target UE pauses the enhanced uplink transmission due to only one code channel available; In sub-frame n+3: the parameters (S, P, Q, N) keep unvaried; In sub-frame n+4: the target UE's channel quality gets improved and the target UE has a much higher P*Q value, so it is allocated more E-PUDCH resources.

Figure 6:
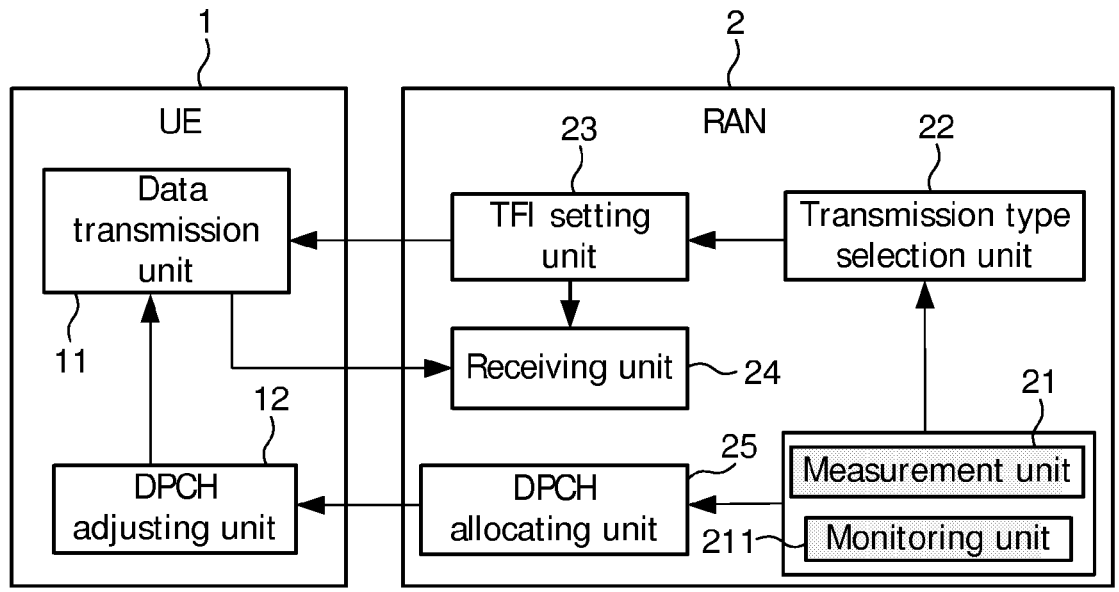
FIG. 6 is a block diagram of an apparatus used for enhanced uplink data transmission according to an embodiment of the present invention.

FIG. 6 is a block diagram of an apparatus used for enhanced uplink data transmission according to an embodiment of the present invention. The embodiment describes the functional blocks of UE and RAN with precondition that RAN 2 determines the transmission type. UE 1 comprises data transmission unit 11 and DPCH adjusting unit 12, in which data transmission unit 11 is used for conducting enhanced uplink transmission on E-PUDCH, and DPCH adjusting unit 12 is used to dynamically adjust E-PUDCH resources accordingly.

RAN2 comprises measurement unit 21, monitoring unit 211, transmission type selection unit 22, TFI (Transport Format Information) setting unit 23, receiving unit 24 and DPCH allocating unit 25; in which measurement unit 21 is used to measure the quality of UE1 uplink channel, monitoring unit 211 is used to monitor the value of Q,P,N and S shown in above FIG. 3; transmission type selection unit 22 is used to select transmission type according to the quality of the UE 1 uplink channel. When channel quality is good with unvaried transmission power, we can select high-order modulation and relating encoding (e.g. 64 QAM, ¾ channel coding), or decrease transmission power when using low-order modulation and relating encoding (e.g. BPSK, ½ channel encoding). TFI setting unit 23 is used to modify the transmission type contained in TFI information according to the selected transmission type. Demodulation unit 24 is used for receiving and demodulating data transmitted by UE1's data transmission unit 11 according to transmission type. DPCH allocating unit 25 is used to dynamically allocate E-PUDCH resource.

When UE1 starts to conduct enhanced uplink transmission, measurement unit 21 measures the quality of uplink channels of UE1, and according to the quality of the UE1's uplink channel, transmission type selection unit 22 selects appropriate transmission type and informs TFI setting unit 23 to modify the transmission type contained in TFI information, in the meanwhile data transmission unit 11 conducts enhanced uplink transmission according to the transmission type, and the data will be sent to demodulation unit 24 that demodulates the data according to the transmission type. During above enhanced uplink transmission process, based on the parameter value monitored by monitoring unit 211 and the method shown in FIG. 3, DPCH allocating unit 25 will dynamically allocate E-PUDCH resources to UE1, while DPCH adjusting unit 12 adjusts the number of E-PUDCH used by it own according to E-PUDCH resource allocation information.

Figure 7:
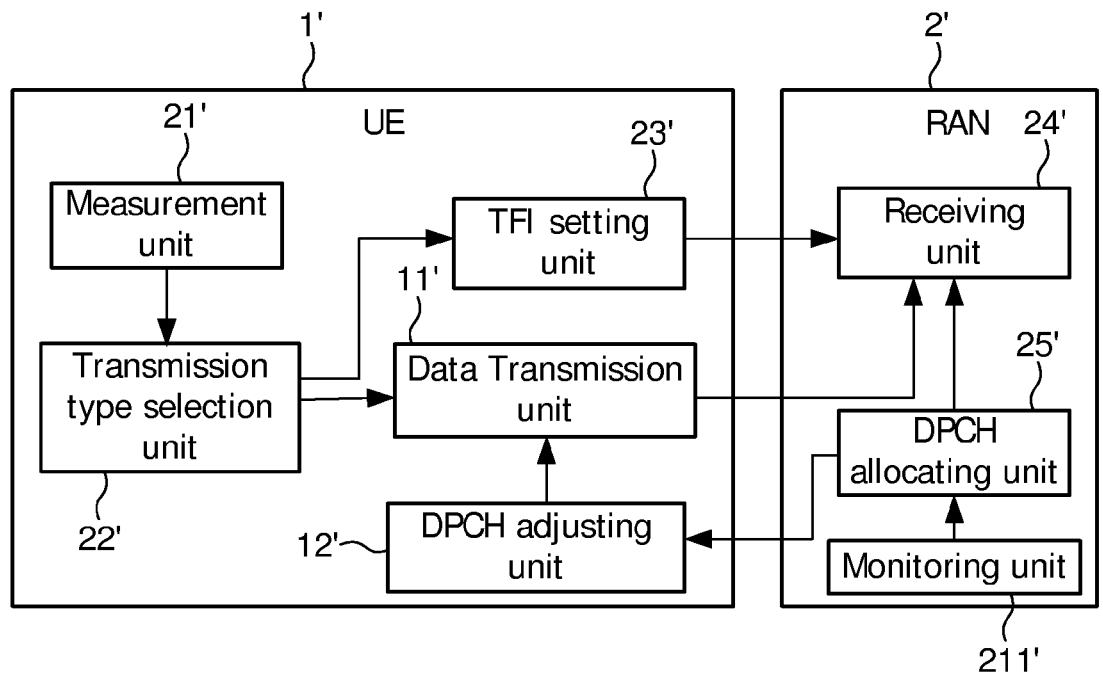
FIG. 7 is a block diagram of an apparatus used for enhanced uplink data transmission according to another embodiment of the present invention.

FIG. 7 is a block diagram of an apparatus used for enhanced uplink data transmission according to another embodiment of the present invention. The embodiment describes the functional blocks of UE and RAN with precondition that UE1' determines the transmission type. UE 1' comprises data transmission unit 11', DPCH adjusting unit 12', measurement unit 21', transmission type selection unit 22' and TFI setting unit 23'. RAN2' comprises monitoring unit 211', receiving unit 24' and DPCH allocating unit 25'. Since the functions of the units are same as that in FIG. 6, the detail description is omitted. In TDD communication system, uplink and downlink transmission are implemented on same frequencies, so the quality of uplink channel can be acquired by measuring the quality of downlink channels.

When UE1 starts to conduct enhanced uplink transmission, measurement unit 21' measures the quality of downlink channels, and according to the quality of the UE1's downlink channel, transmission type selection unit 22' selects appropriate transmission type and inform TFI setting unit 23' to modify the transmission type contained in TFI information, and meanwhile, data transmission unit 11' conducts enhanced uplink transmission according to the transmission type, and the data will be sent to receiving unit 24' that demodulates the data according to the transmission type sent by TFI setting unit 23'. During above enhanced uplink transmission process, based on the parameter value monitored by monitoring unit 211' and the method shown in FIG. 3, DPCH allocating unit 25' will dynamically allocate E-PUDCH resources to UE1', while DPCH adjusting unit 12' adjusts the number of E-PUDCH used by it own according to E-PUDCH resource allocation information.

It is to be understood by those skilled in the art that multicast method and apparatus in P2P-enabled wireless communication networks as disclosed in this invention can be made of various modifications without departing from the spirit and scope of the invention as defined by the appended claims.

The invention claimed is:

1. A method for enhanced uplink data transmission in a radio access network (RAN), comprising the acts of:
  monitoring a communication status of each of a plurality of user equipments (UE) which are conducting uplink data transmission in the RAN;
  receiving data transmitted on at least one dedicated uplink channel from at least one of said plurality of UEs;
  sending by the UE uplink feedback information on said at least one uplink dedicated channel;
  receiving by the UE power control information through a shared control channel, the power control information including transmit power control of said at least one uplink dedicated channel; and
  allocating a number of uplink dedicated channels to at least one of said plurality of UEs dynamically, according to the communication status of said plurality of UEs,
  wherein the act monitoring further comprises the act of:
  measuring by the RAN an uplink channel transmission quality of said at least one dedicated uplink channel used by said UE to get a value of a parameter P which denotes the uplink channel transmission quality of said at least one dedicated uplink channel used by said UE.

2. The method for uplink data transmission as claimed in claim 1, wherein said at least one dedicated uplink channel is an enhanced uplink (EUL) dedicated physical channel.

3. The method for uplink data transmission as claimed in claim 1, wherein the monitoring act further comprises the act of:
acquiring a value of parameter Q, which denotes a QoS level of said UE.

4. The method for uplink data transmission as claimed in claim 3, wherein the monitoring act further comprises the act of:
acquiring a value of a parameter S, which denotes a number of all uplink dedicated channels in the RAN.

5. The method for uplink data transmission as claimed in claim 4, wherein the monitoring act further comprises the act of:
acquiring a value of a parameter N, which denotes a number of said UEs conducting uplink transmission.

6. The method for uplink data transmission as claimed in claim 5, wherein the allocating act further comprises the acts of:
judging if the value of said parameter S is increased; and
if increased, reallocating newly increased EUL dedicated physical channels to appropriate UEs.

7. The method for uplink data transmission as claimed in claim 5, wherein allocating act further comprises the acts of:
judging if the value of said parameter S is decreased; and
if decreased, requesting the UE with a smallest P*Q value to release its uplink dedicated channels, and allocating the released uplink dedicated channels to other UEs.

8. The method for uplink data transmission as claimed in claim 5, wherein the allocating act further comprises the acts of:
judging if the value of said parameter N is increased; and
if increased, requesting the UE with a smallest P*Q value to release its uplink dedicated channels, and allocating the released uplink dedicated channels to new accessed UEs.

9. The method for uplink data transmission as claimed in claim 5, wherein the allocating act further comprises the acts of:
judging if the value of said parameter N is decreased; and
if decreased, reallocating released uplink dedicated channels to other UEs.

10. The method for uplink data transmission as claimed in claim 5, wherein the allocating act further comprises the acts of:
judging if a P*Q value of each of the UEs is changed; and
if the P*Q value of at least one of the UEs is changed, reallocating all uplink dedicated channels according to a current P*Q value of each UE and the current N value.

11. A method for conducting uplink data transmission from a user equipment (UE) to a radio access network (RAN), the method comprising the acts of:
acquiring at least one uplink dedicated channel, which is allocated by said RAN according to a communication status of the UE, wherein said communication status comprises a value of a parameter P;
conducting uplink data transmission on said uplink dedicated channel;
measuring by the RAN an uplink channel transmission quality of the at least one uplink dedicated channel used by said UE to get the value of the parameter P which denotes the uplink channel transmission quality of said at least one uplink dedicated channel used by said UE; and according to allocation information of the RAN, adjusting a number of uplink dedicated channels so as to enable the UE to conduct uplink data transmission on an adjusted uplink dedicated channel, sending uplink feedback information on said uplink dedicated channel, and receiving by said UE power control information through a shared control channel, the power control information including transmit power control of said at least one uplink dedicated channel.

12. The method for uplink data transmission as claimed in claim 11, wherein the said uplink dedicated channel is an enhanced uplink dedicated physical channel.

13. The method for uplink data transmission as claimed in claim 11, wherein the adjusting act further comprises the act of:
receiving Synchronization Shift (SS) control information through said shared control channel.

14. A user equipment (UE), comprising:
a data transmission apparatus for conducting uplink data transmission to a radio access network (RAN) on at least one dedicated uplink channel;
an adjusting apparatus, for adjusting a number of dedicated uplink channels according to allocation information sent from the RAN, which is related to a communication status of the UE, so as to enable the data transmission apparatus to conduct uplink data transmission on adjusted dedicated uplink channels, wherein said communication status comprises a value of a parameter P, which denotes a transmission quality of the at least one dedicated uplink channel used by said UE, wherein the value of the parameter P is measured by the RAN;
a transmitter configured to send uplink feedback information on said at least one uplink dedicated channel; and
a receiver configured to power control information through a shared control channel, the power control information including transmit power control of said at least one uplink dedicated channel.

15. The UE as claimed in claim 14, wherein said UE further comprises:
a measurement apparatus for measuring quality of a downlink channel used by the UE, so as to provide the communication status to the RAN.

16. A radio access network (RAN) used for a plurality of user equipments (UEs) to conduct uplink data transmission on at least one dedicated uplink channel, said RAN comprising:
a monitoring apparatus for monitoring communication status of said plurality of UEs;
a receiving apparatus for receiving the data by enhanced uplink transmission from the plurality of UEs; and
an allocating apparatus for dynamically allocating a number of dedicated uplink channels for at least one UE according to the communication status of said plurality of UEs,
said receiving apparatus further receiving uplink feedback information on said at least one uplink dedicated channel, and
the monitoring apparatus further monitoring power control information included in a shared control channel,
wherein said monitoring apparatus monitors the communication status of the UE, including measuring an uplink channel transmission quality of said at least one dedicated uplink channel used by said UE to get a value of a parameter P which denotes the uplink channel transmission quality of said at least one dedicated uplink channel used by said UE.

17. The RAN as claimed in claim 16, wherein said monitoring apparatus monitors the communication status of the UE, including acquiring a value of a parameter Q that denotes a QoS level of said UE.

18. The RAN as claimed in claim 16, wherein said monitoring apparatus monitors the communication status of the UE, including acquiring a value of a parameter S that denotes a number of all uplink dedicated channels in the RAN.

19. The RAN as claimed in claim 16, wherein said monitoring apparatus monitors the communication status of the UE, including acquiring a value of a parameter N that denotes a number of said UEs conducting an uplink transmission.

20. The method of claim 1, wherein the allocating act is performed by the RAN, and further comprising the act of, in response to the allocating act, adjusting the number of uplink dedicated channels by the UE so as to enable the UE to conduct the enhanced uplink data transmission on an adjusted uplink dedicated channel.

* * * * *